(12) United States Patent
Niu et al.

(10) Patent No.: US 11,270,693 B2
(45) Date of Patent: Mar. 8, 2022

(54) SPEECH INFORMATION PROCESSING METHOD, DEVICE AND STORAGE MEDIUM

(71) Applicant: BEIJING XIAOMI MOBILE SOFTWARE CO., LTD., Beijing (CN)

(72) Inventors: Yi Niu, Beijing (CN); Hongyu Wang, Beijing (CN); Xuefang Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 173 days.

(21) Appl. No.: 16/714,790

(22) Filed: Dec. 15, 2019

(65) Prior Publication Data
US 2021/0074273 A1  Mar. 11, 2021

(30) Foreign Application Priority Data

Sep. 9, 2019  (CN) .......................... 201910848567.7

(51) Int. Cl.
*G10L 15/187* (2013.01)
*G10L 15/02* (2006.01)
(Continued)

(52) U.S. Cl.
CPC ............ *G10L 15/187* (2013.01); *G10L 15/02* (2013.01); *G10L 15/22* (2013.01); *G10L 15/30* (2013.01);
(Continued)

(58) Field of Classification Search
CPC ......... G10L 15/02; G10L 15/08; G10L 15/22; G10L 15/183; G10L 15/187
(Continued)

(56) References Cited

U.S. PATENT DOCUMENTS 6,581,034 B1   6/2003  Choi et al.
9,092,419 B2 *  7/2015  Kay ...................... G06F 40/274
(Continued)

FOREIGN PATENT DOCUMENTS

CN    1667700 A    9/2005
CN    107195296 A   9/2017
(Continued)

OTHER PUBLICATIONS

Extended European Search Report in Application No. 20151035.1, dated Jun. 19, 2020.
(Continued)

*Primary Examiner* — Susan I McFadden
(74) *Attorney, Agent, or Firm* — Syncoda LLC; Feng Ma

(57) ABSTRACT

A speech information processing method includes: determining text information corresponding to collected speech information according to a speech recognition technology, wherein the text information comprises a word; with the word in the text information as a target word, determining one or more fuzzy words corresponding to the target word according to a phoneme sequence corresponding to the target and a preset phonetic dictionary, wherein the phonetic dictionary comprises a plurality of words and phoneme sequences corresponding to the plurality of words; and outputting the target word and the one or more fuzzy words corresponding to the target word.

11 Claims, 5 Drawing Sheets

Determine text information corresponding to collected speech information according to a speech recognition technology — S201

With the word in the text information as a target word, determine one or more fuzzy words corresponding to the target word according to a phoneme sequence corresponding to the target and a preset phonetic dictionary — S202

Output the target word and the one or more fuzzy words corresponding to the target word — S203

(51) Int. Cl.
  *G10L 15/22* (2006.01)
  *G10L 15/30* (2013.01)
(52) U.S. Cl.
  CPC .. *G10L 2015/025* (2013.01); *G10L 2015/223* (2013.01)
(58) Field of Classification Search
  USPC .......................................................... 704/235
  See application file for complete search history.

(56) References Cited

U.S. PATENT DOCUMENTS

| | | | |
|---|---|---|---|
| 9,135,912 | B1 | 9/2015 | Strope et al. |
| 10,593,346 | B2 * | 3/2020 | Van Gysel ............ G10L 15/183 |
| 10,839,159 | B2 * | 11/2020 | Yang ....................... G06N 5/022 |
| 2002/0013707 | A1 | 1/2002 | Shaw et al. |
| 2008/0270138 | A1 | 10/2008 | Knight et al. |
| 2009/0157383 | A1 | 6/2009 | Cho et al. |
| 2011/0282667 | A1 | 11/2011 | Hernandez-Abrego |
| 2014/0372122 | A1 | 12/2014 | Arsham et al. |

FOREIGN PATENT DOCUMENTS

| | | |
|---|---|---|
| CN | 108417202 A | 8/2018 |
| CN | 109841209 A | 6/2019 |
| JP | 2002215184 A | 7/2002 |
| JP | 2006146008 A | 6/2006 |
| JP | 2013125144 A | 6/2013 |
| WO | 2014137761 A1 | 9/2014 |

OTHER PUBLICATIONS

International Search Report in Application No. PCT/ CN2019/ 111308, dated Jun. 4, 2020.
RU Office Action in Application No. 2019143666, dated Aug. 3, 2020.
WIPO English Version of International Search Report in Application No. PCT/CN2019/111308, dated Jun. 4, 2020.
Korea 1st Office Action in Application No. 10-2019-7032746, dated Apr. 22, 2021.
Japan 1st Office Action in Application No. 2019-562645, dated Dec. 21, 2021.

* cited by examiner

SPEECH INFORMATION PROCESSING METHOD, DEVICE AND STORAGE MEDIUM

CROSS-REFERENCE TO RELATED APPLICATION

This application claims priority to Chinese Patent Application No. 201910848567.7 filed on Sep. 9, 2019, the disclosure of which is hereby incorporated by reference in its entirety.

BACKGROUND

With the rapid development of information technologies, Automatic Speech Recognition (ASR) technology has also developed rapidly. Speech recognition is a comprehensive application technology that uses computers to automatically convert from speech to text. The ASR technology integrates excellent results in a series of basic subjects including signal processing, pattern recognition, machine learning, numerical analysis, natural language processing, and high-performance computing, and the ASR technology is a interdisciplinary application-oriented research that has been widely used in language learning and other fields.

SUMMARY

Embodiments of the present disclosure generally relate to information technologies, and more particularly, to a speech information processing method, device and storage medium.

According to a first aspect of embodiments of the present disclosure, there is provided a speech information processing method, including:

determining text information corresponding to collected speech information according to a speech recognition technology, wherein the text information includes a word;

with the word in the text information as a target word, determining one or more fuzzy words corresponding to the target word according to a phoneme sequence corresponding to the target and a preset phonetic dictionary, wherein the phonetic dictionary comprises a plurality of words and phoneme sequences corresponding to the plurality of words; and outputting the target word and the one or more fuzzy words corresponding to the target word.

According to some embodiments, determining one or more fuzzy words corresponding to the target word according to a phoneme sequence corresponding to the target and a preset phonetic dictionary, includes:

from the plurality of words in the phonetic dictionary, selecting one or more words corresponding to a phoneme sequence that is the same as the phoneme sequence corresponding to the target word as the one or more fuzzy words corresponding to the target word.

According to some embodiments, determining one or more fuzzy words corresponding to the target word according to a phoneme sequence corresponding to the target and a preset phonetic dictionary, includes:

if the phoneme sequence corresponding to the target word includes a phoneme of a first preset type, selecting from the plurality of words in the phonetic dictionary one or more words corresponding to a phoneme sequence that meets the following conditions as the one or more fuzzy words corresponding to the target word, with the phoneme sequence corresponding to the target word as a reference sequence:

the phoneme sequence corresponding to the one or more words in the phonetic dictionary includes the phoneme of the first preset type, and a position of the phoneme of the first preset type in the phoneme sequence corresponding to the one or more words in the phonetic dictionary is the same with a position of the phoneme of the first preset type in the reference sequence; and a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type.

According to some embodiments, determining one or more fuzzy words corresponding to the target word according to a phoneme sequence corresponding to the target and a preset phonetic dictionary, includes:

if a first phoneme and/or a last phoneme in the phoneme sequence corresponding to the target word is a phoneme of a second preset type, integrating other phonemes in the phoneme sequence than the phoneme of the second preset type into a new phoneme sequence, and selecting, from the plurality of words in the phonetic dictionary, one or more words corresponding to a phoneme sequence that is the same with the new phoneme sequence as the one or more fuzzy words corresponding to the target word.

According to some embodiments, outputting the target word and the one or more fuzzy words corresponding to the target word, includes:

ranking the one or more fuzzy words corresponding to the target word according to a preset priority;

if the number of the one or more fuzzy words corresponding to the target word is greater than a preset number, selecting fuzzy words of the preset number from all the fuzzy words corresponding to the target word according to a ranking result, and outputting the target word and the selected fuzzy words; and if the number of the one or more fuzzy words corresponding to the target word is smaller than or equal to the preset number, outputting the target word and all the one or more fuzzy words corresponding to the target word according to the ranking result.

According to a second aspect of embodiments of the present disclosure, there is provided a speech information processing device, including:

a first determination module configured to determine text information corresponding to collected speech information according to a speech recognition technology, wherein the text information includes a word;

a second determination module configured to, with the word in the text information as a target word, determine one or more fuzzy words corresponding to the target word according to a phoneme sequence corresponding to the target and a preset phonetic dictionary, wherein the phonetic dictionary includes a plurality of words and phoneme sequences corresponding to the plurality of words; and an output module configured to output the target word and the one or more fuzzy words corresponding to the target word.

According to some embodiments, the second determination module includes:

a first selection sub-module configured to, from the plurality of words in the phonetic dictionary, select one or more words corresponding to a phoneme sequence that is the same as the phoneme sequence corresponding to the target word as the one or more fuzzy words corresponding to the target word.

According to some embodiments, the second determination module includes:

a selection sub-module configured to, if the phoneme sequence corresponding to the target word includes a phoneme of a first preset type, select from the plurality of words in the phonetic dictionary one or more words corresponding to a phoneme sequence that meets the following conditions as the one or more fuzzy words corresponding to the target word, with the phoneme sequence corresponding to the target word as a reference sequence:

the phoneme sequence corresponding to the one or more words in the phonetic dictionary includes the phoneme of the first preset type, and a position of the phoneme of the first preset type in the phoneme sequence corresponding to the one or more words in the phonetic dictionary is the same with a position of the phoneme of the first preset type in the reference sequence; and a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type.

According to some embodiments, the second determination module includes:

a third selection sub-module configured to, if a first phoneme and/or a last phoneme in the phoneme sequence corresponding to the target word is a phoneme of a second preset type, integrate other phonemes in the phoneme sequence than the phoneme of the second preset type into a new phoneme sequence, and select from the plurality of words in the phonetic dictionary, one or more words corresponding to a phoneme sequence that is the same with the new phoneme sequence as the one or more fuzzy words corresponding to the target word.

According to some embodiments, the output module includes:

a ranking sub-module configured to rank the one or more fuzzy words corresponding to the target word according to a preset priority;

a first output sub-module configured to, if the number of the one or more fuzzy words corresponding to the target word is greater than a preset number, select fuzzy words of the preset number from all the fuzzy words corresponding to the target word according to a ranking result, and outputting the target word and the selected fuzzy words; and a second output sub-module configured to, if the number of the one or more fuzzy words corresponding to the target word is smaller than or equal to the preset number, output the target word and all the one or more fuzzy words corresponding to the target word according to the ranking result.

According to a third aspect of embodiments of the present disclosure, there is provided a speech information processing device, including:

a processor; and a memory for storing instructions executable by the processor;

wherein the processor is configured to:

determine text information corresponding to collected speech information according to a speech recognition technology, wherein the text information includes a word;

with the word in the text information as a target word, determine one or more fuzzy words corresponding to the target word according to a phoneme sequence corresponding to the target and a preset phonetic dictionary, wherein the phonetic dictionary includes a plurality of words and phoneme sequences corresponding to the plurality of words; and output the target word and the one or more fuzzy words corresponding to the target word.

According to a fourth aspect of embodiments of the present disclosure, there is provided a computer-readable storage medium having computer program instructions stored thereon, wherein when the program instructions are executed, steps in the speech information processing method according to the first aspect are performed.

The above general description and the following detailed description are merely exemplary and explanatory and are not limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the present disclosure. Instead, they are merely examples of devices and methods consistent with aspects related to the present disclosure as recited in the appended claims.

It is to be understood that the terms "first," "second" and the like in the specification and claims of the present disclosure and the above-mentioned figures are used to distinguish similar objects, and are not necessarily to be construed as a specific order.

The speech recognition technology generally uses a statistical pattern recognition algorithm to identify the collected speech information. However, for fields such as language learning, there are a large number of words which are homonyms and words pronunciations of which are usually confusing in English and other languages. Some embodiments of the present disclosure can recognize the difficulty of accurately recognizing such words by using speech recognition technologies.

Figure 1:
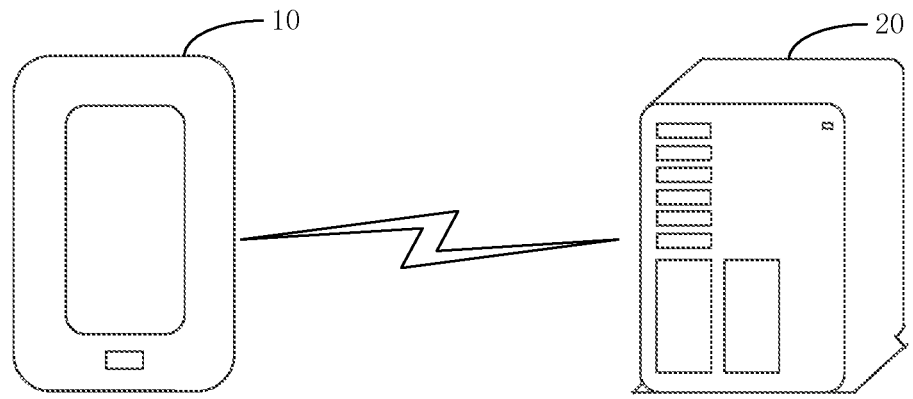
FIG. 1 is a schematic diagram of an implementation environment according to some embodiments.

An implementation environment involved in the embodiments of the present disclosure is first described. FIG. 1 is a schematic diagram of an implementation environment involved in embodiments of the present disclosure. As shown in FIG. 1, an implementation environment involved in embodiments of the present disclosure includes a user terminal 10 and a server 20, and there is a communication connection between the user terminal 10 and the server 20. The user terminal 10 can collect speech information input by a user through a built-in speech collection device (such as a microphone) and send the collected speech information to the server 20. The server 20 processes the collected speech information to determine the text information corresponding to the speech information and one or more fuzzy words corresponding to the word(s) in the text information, and sends the word(s) in the text information and the one or more fuzzy words corresponding to the word(s) to the user terminal 10. The user terminal 10 displays the word(s) and the corresponding fuzzy words sent from the server for user's selection.

It should be noted that in this implementation environment, various wired or wireless technologies can be used between the user terminal 10 and the server 20 to establish a communication connection. For example, the connection manner may include, but is not limited to, Bluetooth, Wi-Fi (Wireless-Fidelity), 2G network, 3G network, 4G network, 5G network, and the like. The user terminal 10 can be, for example, a smartphone, a tablet, a PDA (Personal Digital Assistant), a smart wearable device, and so on, and the server 20 can be any device capable of providing speech information processing functions.

In addition, the speech information processing method provided by the embodiments of the present disclosure may also be performed locally on the user terminal 10. For example, the user terminal 10 may collect speech information through a built-in speech collection device (such as a microphone), process the collected speech information, determine text information corresponding to the speech information and one or more fuzzy words corresponding to the word(s) in the text information, and then output and display the word(s) in the text information and the one or more fuzzy words corresponding to the word(s) through a display device (such as the display screen) for the user to select.

Based on the implementation environment shown in FIG. 1, an embodiment of the present disclosure provides a speech information processing method. The method can be applied in the user terminal 10 or the server 20 shown in FIG. 1.

Figure 2:
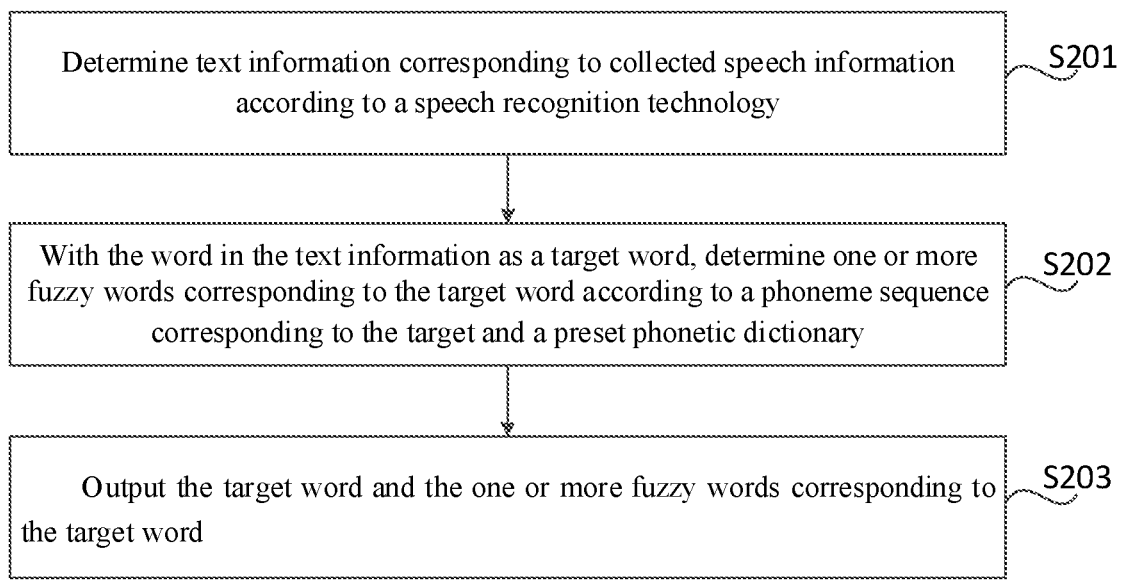
FIG. 2 is a flowchart of a speech information processing method according to some embodiments.

FIG. 2 is a flowchart of a speech information processing method according to some embodiments. The method can include the following steps.

In step S201, text information corresponding to collected speech information is determined according to a speech recognition technology.

The text information can include a word.

In some embodiments, pre-processes may be performed on the collected speech information, such as noise reduction, framing processing, pre-emphasis and windowing processing, and features of the processed speech information are extracted. Then, the extracted features are input into a pre-established speech recognition model to obtain corresponding text information. The speech recognition model may be obtained by training a large amount of speech information and corresponding text information. For example, the speech recognition model may be a Hidden Markov Model (HMM) or a neural network (NN) model. Embodiments of the present disclosure do not impose specific limitations on this.

It should be noted that the manners of pre-processing and feature extraction of the collected speech information are well known to those skilled in the art, and will not be elaborated in the embodiments of the present disclosure.

In addition, the collected speech information may be processed by other speech recognition technologies known to those skilled in the art to determine the text information corresponding to the speech information, which is not limited in the embodiments of the present disclosure.

In step S202, with the word in the text information as a target word, one or more fuzzy words corresponding to the target word are determined according to a phoneme sequence corresponding to the target and a preset phonetic dictionary.

The phonetic dictionary includes a plurality of words and phoneme sequences corresponding to the plurality of words.

In some embodiments of the present disclosure, a phoneme is minimal unit of speech, and a phoneme sequence is an ordered sequence in which a plurality of phonemes are integrated. The phoneme sequence corresponding to the target word can be determined by searching the phonetic dictionary. For example, the word "bad" correspond to a phoneme sequence including three phonemes /b/, /æ/, and /d/. In some embodiments, phonetic dictionaries for a plurality of languages may be preset, and according to a language corresponding to the collected speech, a phonetic dictionary corresponding to the language may be selected. For example, if the language corresponding to the speech is English, an English phonetic dictionary is selected.

In languages such as English, homonyms are difficult to distinguish, words that contain indistinguishable phonemes ("bad" and "bed" contain indistinguishable phonemes /æ/ and /e/) are confusing, and words in which the first or last phoneme is voiceless consonants are indistinguishable from other words (for example, it is not easy to distinguish "bite" and "buy"). In exemplary implementations, step S201 can be implemented by one or more of the following three alternative embodiments.

Embodiment 1: Regarding Homonyms

The phoneme sequence corresponding to the homonyms is the same. Therefore, in the exemplary implementations, one or more words corresponding to a phoneme sequence that is the same as the phoneme sequence corresponding to the target word may be selected from the plurality of words in the phonetic dictionary as the one or more fuzzy words corresponding to the target word. For example, if the target word is "two", its phonetic symbol is /tuː/, and the corresponding phoneme sequence is /t/ and /uː/, the word "too" with the same phoneme sequence is selected from a corresponding phonetic dictionary as the fuzzy word of the target word "two". Similarly, if the target word is "be," the word "bee" with the phoneme sequence that is the same as the phoneme sequence (/b/, /iː/) of the target word "be" is selected from the corresponding phonetic dictionary as the fuzzy word of the target word "be".

Embodiment 2: Regarding Words Containing Indistinguishable Phonemes

For example, if the phoneme sequence corresponding to the target word includes a phoneme of a first preset type, one or more words corresponding to a phoneme sequence that meets the following conditions (1) and (2) are selected from the plurality of words in the phonetic dictionary as the one or more fuzzy words corresponding to the target word (with the phoneme sequence corresponding to the target word as a reference sequence): (1) the phoneme sequence corresponding to the one or more words in the phonetic dictionary includes the phoneme of the first preset type, and a position of the phoneme of the first preset type in the phoneme sequence corresponding to the one or more words in the phonetic dictionary is the same with a position of the phoneme of the first preset type in the reference sequence; and (2) a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type. The phoneme of the first preset type may be set by users or manufactures depending on actual needs. For example, the phoneme of the first preset type may include, but is not limited to, phonemes which are difficult to distinguish, for example, /æ/, /e/, and /a:/.

For example, the target word is "bed," the corresponding phonetic symbol is /bed/, and the corresponding phoneme sequence is /b/, /e/ and /d/, and the phoneme sequence contains the first preset type phoneme /e/. The word "bad" (the corresponding phoneme sequence is /b/, /æ/ and /d/) is selected from the words in the phonetic dictionary as the fuzzy word of the target word "bed".

Embodiment 3: Regarding Words in which the First or Last Phoneme is a Voiceless Consonant In this case, when the speech information is recognized, there may be a problem that the voiceless consonant phoneme of the word may be ignored and the recognition result is inaccurate. For example, the word "bite" is usually misidentified as the word "buy". Thus, if a first phoneme and/or a last phoneme in the phoneme sequence corresponding to the target word is a phoneme of a second preset type, other phonemes in the phoneme sequence than the phoneme of the second preset type are integrated into a new phoneme sequence, and one or more words corresponding to a phoneme sequence that is the same with the new phoneme sequence are selected from the plurality of words in the phonetic dictionary as the one or more fuzzy words corresponding to the target word. The phoneme of the second preset type may be set by users or manufactures depending on actual needs. For example, the phoneme of the second preset type may include, but is not limited to, voiceless consonant phoneme, such as /p/, /t/, /k/, /s/, /f/, and so on.

For example, the target word is "bite," the corresponding phonetic symbol is /bait/, and the corresponding phoneme sequence is /b/, /ai/, and /t/, and the last phoneme is the second preset type phoneme. The phonemes other than /t/ are integrated into a new phoneme sequence /b/ and /ai/, and the word "buy" with a phoneme sequence that is the same as the new phoneme sequence is selected from the phonetic dictionary as the fuzzy word of the target word "bite".

In step S203, the target word and the one or more fuzzy words corresponding to the target word are output.

In some embodiments, the target word and all fuzzy words corresponding to the target word may be output.

In some other embodiments, considering that the target word may correspond to a large number of fuzzy words, if all the fuzzy words are output for the user to select, the user experience may be affected to some extent. Therefore, the one or more fuzzy words corresponding to the target word are ranked according to a preset priority; if the number of the one or more fuzzy words corresponding to the target word is greater than a preset number, fuzzy words of the preset number are selected from all the fuzzy words corresponding to the target word according to a ranking result, and the target word and the selected fuzzy words are output; if the number of the one or more fuzzy words corresponding to the target word is smaller than or equal to the preset number, the target word and all the one or more fuzzy words corresponding to the target word are output according to the ranking result. For example, all the fuzzy words corresponding to the target word may be ranked in a descending order according to the preset priority from high to low. If the number of fuzzy words is greater than the preset number N, the first N fuzzy words are selected according to the ranking result, and the target word and the N fuzzy words are output and displayed. According to other embodiments, all the fuzzy words corresponding to the target word may be ranked in an ascending order according to the preset priority from low to high. If the number of the fuzzy words is greater than the preset number N, the last N fuzzy words are selected according to the ranking result, and the target word and the selected N fuzzy words are output and displayed.

The preset number and the preset priority may be preset by users or manufacturers as needed. For example, the preset number may be any integer between 10 and 20. The preset priority may include the following situations. For example, (1) the fuzzy words determined according to Embodiment 1 (i.e., the fuzzy words having the same pronunciation as that of the target word) have a higher priority than the fuzzy words determined according to other embodiments; (2) for the fuzzy words determined according to Embodiment 2, if the target word contains a phoneme /e/, the fuzzy words containing a phoneme /æ/ have a higher priority than the fuzzy words containing a phoneme /a:/; (3) the fuzzy words which frequently occurs in daily life have a higher priority than the fuzzy words which less frequently occurs in daily life.

It should be noted that, if the speech information processing method described in the foregoing embodiments is implemented by the user terminal, the processing unit of the user terminal may output the target word and the fuzzy words corresponding to the target word to the display device of the user terminal (such as a display screen), so that a user may select correct words from these displayed words. If the speech information processing method described in the above embodiments is implemented by the server, the server may send the target word and the fuzzy words corresponding to the target word to user terminal which communicates with the server. The user terminal displays the target word and corresponding fuzzy words corresponding to the target word, so that the user can select correct words from the displayed words.

In the speech information processing method according to embodiments of the present disclosure, text information corresponding to collected speech information is determined according to a speech recognition technology. With the word in the text information as a target word, one or more fuzzy words corresponding to the target word are determined according to a phoneme sequence corresponding to the target and a preset phonetic dictionary. The target word and the one or more fuzzy words corresponding to the target word are output for users' selection. In this way, embodiments of the present disclosure can address the problem with existing speech recognition technologies, i.e., words which are homonyms and words pronunciations of which are usually confusing cannot be accurately recognized, thereby improving user experience.

Some embodiments of the present disclosure further provide an information processing device applicable to the user terminal 10 or the server 20 shown in FIG. 1.

Figure 3:
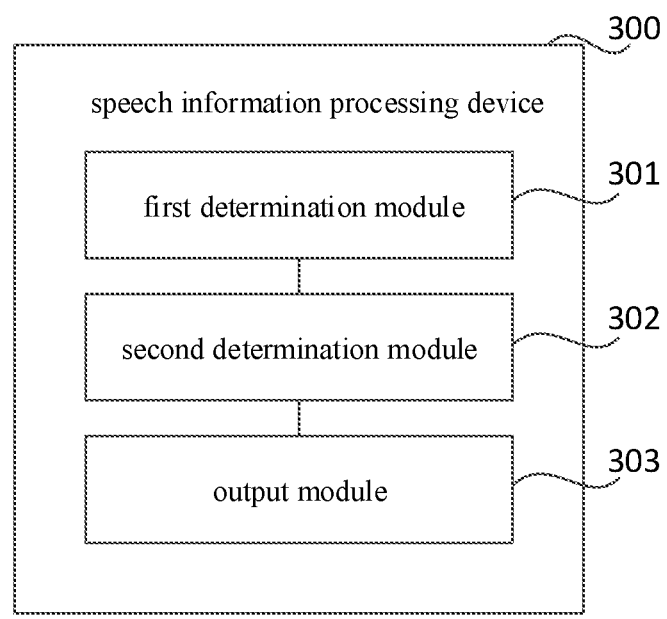
FIG. 3 is a block diagram of a speech information processing device according to some embodiments.

FIG. 3 is a block diagram of a speech information processing device according to some embodiments. The device 300 includes a first determination module 301, a second determination module 302, and an output module 303.

The first determination module 301 is configured to determine text information corresponding to collected speech information according to a speech recognition technology. The text information includes a word.

The second determination module 302 is configured to, with the word in the text information as a target word, determine one or more fuzzy words corresponding to the target word according to a phoneme sequence corresponding to the target and a preset phonetic dictionary. The phonetic dictionary includes a plurality of words and phoneme sequences corresponding to the plurality of words.

The output module 303 is configured to output the target word and the one or more fuzzy words corresponding to the target word.

According to some embodiments, the second determination module 302 includes a first selection sub-module 321.

The first selection sub-module 321 is configured to, from the plurality of words in the phonetic dictionary, select one or more words corresponding to a phoneme sequence that is the same as the phoneme sequence corresponding to the target word as the one or more fuzzy words corresponding to the target word.

Figure 4:
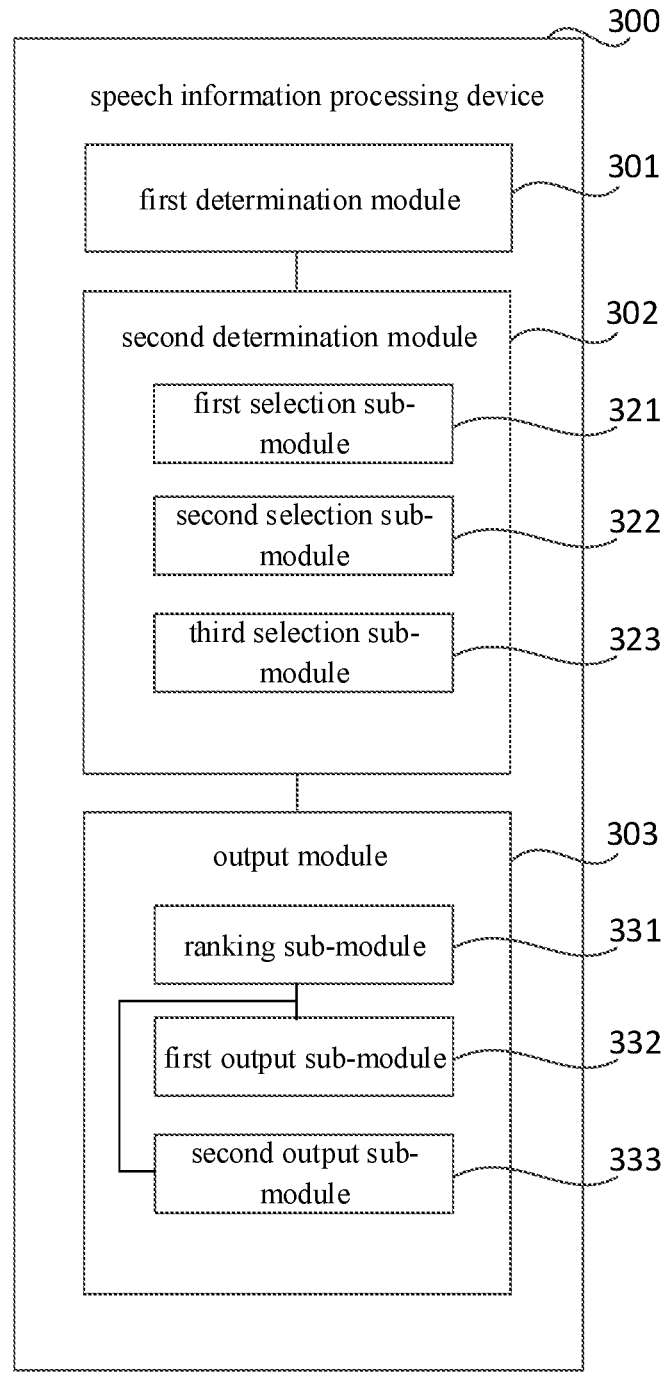
FIG. 4 is a block diagram of a speech information processing device according to some other embodiments.

According to some embodiments, as shown in FIG. 4, the second determination module 302 includes a second selection sub-module 322.

The second selection sub-module 322 is configured to, if the phoneme sequence corresponding to the target word includes a phoneme of a first preset type, select from the plurality of words in the phonetic dictionary one or more words corresponding to a phoneme sequence that meets the following conditions as the one or more fuzzy words corresponding to the target word, with the phoneme sequence corresponding to the target word as a reference sequence.

The conditions can include that:

the phoneme sequence corresponding to the one or more words in the phonetic dictionary includes the phoneme of the first preset type, and a position of the phoneme of the first preset type in the phoneme sequence corresponding to the one or more words in the phonetic dictionary is the same with a position of the phoneme of the first preset type in the reference sequence; and a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type.

According to some embodiments, as shown in FIG. 4, the second determination module 302 includes a third selection sub-module 323.

The third selection sub-module 323 is configured to, if a first phoneme and/or a last phoneme in the phoneme sequence corresponding to the target word is a phoneme of a second preset type, integrate other phonemes in the phoneme sequence than the phoneme of the second preset type into a new phoneme sequence, and select from the plurality of words in the phonetic dictionary, one or more words corresponding to a phoneme sequence that is the same with the new phoneme sequence as the one or more fuzzy words corresponding to the target word.

According to some embodiments, as shown in FIG. 4, the output module 303 includes a ranking sub-module 331, a first output sub-module 332, and a second output sub-module 333.

The ranking sub-module 331 is configured to rank the one or more fuzzy words corresponding to the target word according to a preset priority.

The first output sub-module 332 is configured to, if the number of the one or more fuzzy words corresponding to the target word is greater than a preset number, select fuzzy words of the preset number from all the fuzzy words corresponding to the target word according to a ranking result, and outputting the target word and the selected fuzzy words.

The second output sub-module 333 is configured to, if the number of the one or more fuzzy words corresponding to the target word is smaller than or equal to the preset number, output the target word and all the one or more fuzzy words corresponding to the target word according to the ranking result.

With respect to the devices in the above embodiments, the specific manners for performing operations for individual modules therein have been described in detail in the embodiments regarding the methods, which will not be elaborated herein.

In addition, those skilled in the art can clearly understand that for the convenience and brevity of the description, the division of functional modules described above is illustrated. In practical applications, the above function assignment can be completed by different functional modules as needed. The internal structure of the device is divided into different functional modules to perform all or part of the functions described above.

In the speech recognition device, text information corresponding to collected speech information is determined according to a speech recognition technology. With the word in the text information as a target word, one or more fuzzy words corresponding to the target word are determined according to a phoneme sequence corresponding to the target and a preset phonetic dictionary. The target word and the one or more fuzzy words corresponding to the target word are output for users' selection. In this way, embodiments of the present disclosure can address the problem with existing speech recognition technologies, e.g., words which are homonyms and words pronunciations of which are usually confusing cannot be accurately recognized, thereby improving user experience.

Some embodiments of the present disclosure also provide a non-transitory computer-readable storage medium having stored thereon computer program instructions that, when executed by a processor or processing circuit, implement the steps of the speech information processing method provided by embodiments of the present disclosure.

Some embodiments of the present disclosure also provide a speech information processing device including: a processor; a memory for storing processor-executable instructions; wherein the processor is configured to implement the steps of the speech information processing method provided by embodiments of the present disclosure.

Figure 5:
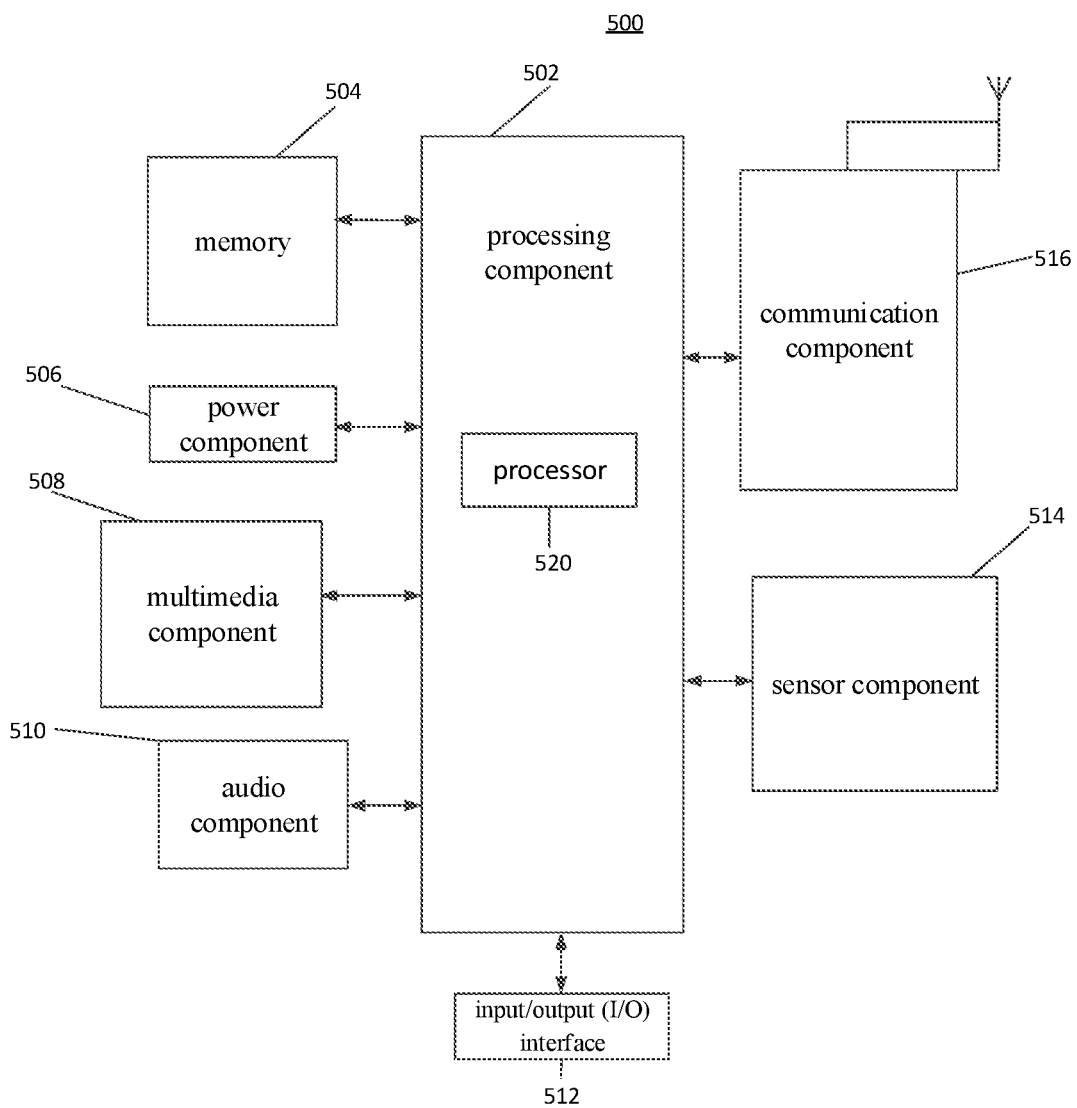
FIG. 5 is a block diagram of a device for a speech information processing method according to some embodiments.

FIG. 5 is a block diagram of a speech information processing device 500 according to some embodiments. For example, the device 500 may be provided as a user terminal. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 820 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as Wi-Fi, 2G, 3G, 4G, or 5G, or a combination thereof. In one some embodiments, the communication component 516 receives a broadcast signal or broadcast associated information from an external broadcast management system via a broadcast channel. In one some embodiments, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, a flash drive such as a USB drive or an SD card, and the like.

Figure 6:
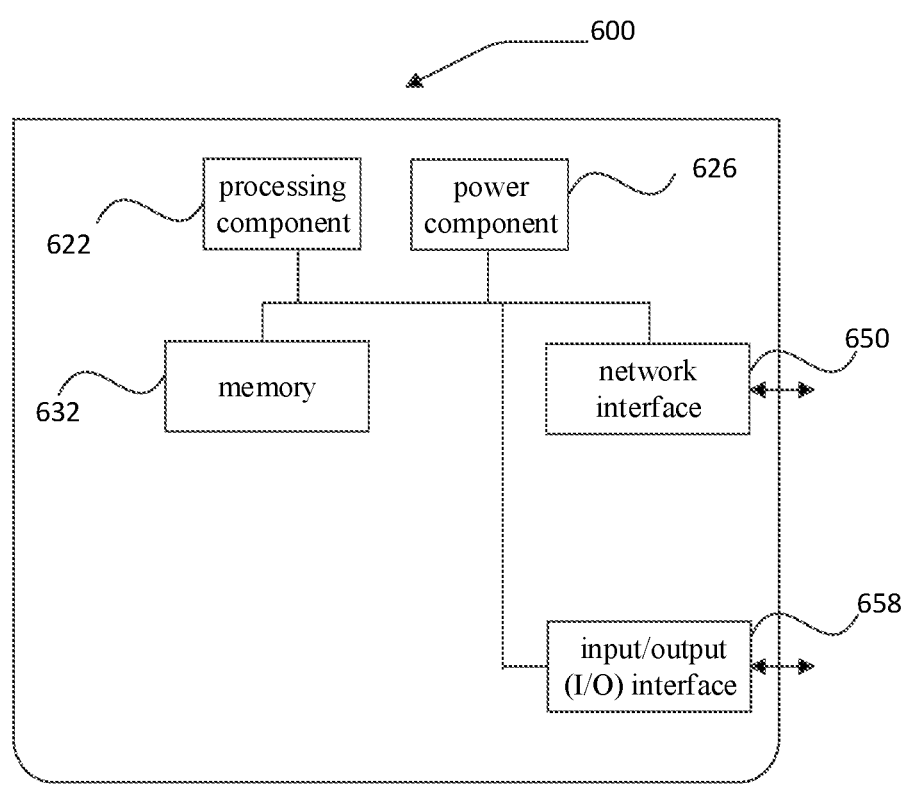
FIG. 6 is a block diagram of a device for a speech information processing method according to some other embodiments.

FIG. 6 is a block diagram of a 600 for a speech information processing method according to some embodiments. For example, the device 600 may be provided as a server. Referring to FIG. 6, the device 600 includes a processing component 622 that further includes one or more processors, and memory resources represented by a memory 632 for storing instructions executable by the processing component 622, such as application programs. The application programs stored in the memory 632 may include one or more modules each corresponding to a set of instructions. Further, the processing component 622 is configured to execute the instructions to perform the above described speech information processing method.

The device 600 may also include a power component 626 configured to perform power management of the device 600, wired or wireless network interface(s) 650 configured to connect the device 600 to a network, and an input/output (I/O) interface 658. The device 600 may operate based on an operating system stored in the memory 632, such as Windows Server™, Mac OS X™, Unix™, Linux™, FreeBSD™ or the like.

Various embodiments of the present disclosure can have one or more of the following advantages.

Text information corresponding to collected speech information is determined according to a speech recognition technology. With the word in the text information as a target word, one or more fuzzy words corresponding to the target word are determined according to a phoneme sequence corresponding to the target and a preset phonetic dictionary. The target word and the one or more fuzzy words corresponding to the target word are output for users' selection. In this way, embodiments of the present disclosure can address the problem with existing speech recognition technologies, e.g., words which are homonyms and words pronunciations of which are usually confusing cannot be accurately recognized, thereby improving user experience.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A speech information processing method, comprising:
   determining text information corresponding to collected speech information according to a speech recognition technology, wherein the text information comprises a word;
   with the word in the text information as a target word, determining one or more fuzzy words corresponding to the target word according to a phoneme sequence corresponding to the target and a preset phonetic dictionary, wherein the phonetic dictionary comprises a plurality of words and phoneme sequences corresponding to the plurality of words; and
   outputting the target word and the one or more fuzzy words corresponding to the target word;
   wherein the outputting the target word and the one or more fuzzy words corresponding to the target word comprises:
   ranking the one or more fuzzy words corresponding to the target word according to a preset priority;
   if the number of the one or more fuzzy words corresponding to the target word is greater than a preset number, selecting fuzzy words of the preset number from all the fuzzy words corresponding to the target word according to a ranking result, and outputting the target word and the selected fuzzy words; and
   if the number of the one or more fuzzy words corresponding to the target word is smaller than or equal to the preset number, outputting the target word and all the one or more fuzzy words corresponding to the target word according to the ranking result.

2. The method according to claim 1, wherein the determining one or more fuzzy words corresponding to the target word according to a phoneme sequence corresponding to the target and a preset phonetic dictionary, comprises:
   from the plurality of words in the phonetic dictionary, selecting one or more words corresponding to a phoneme sequence that is the same as the phoneme sequence corresponding to the target word as the one or more fuzzy words corresponding to the target word.

3. The method according to claim 1, wherein the determining one or more fuzzy words corresponding to the target word according to a phoneme sequence corresponding to the target and a preset phonetic dictionary, comprises:
   if the phoneme sequence corresponding to the target word comprises a phoneme of a first preset type, selecting from the plurality of words in the phonetic dictionary one or more words corresponding to a phoneme sequence that meets the following conditions as the one or more fuzzy words corresponding to the target word, with the phoneme sequence corresponding to the target word as a reference sequence:
   the phoneme sequence corresponding to the one or more words in the phonetic dictionary comprises the phoneme of the first preset type, and a position of the phoneme of the first preset type in the phoneme sequence corresponding to the one or more words in the phonetic dictionary is the same with a position of the phoneme of the first preset type in the reference sequence; and
   a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type.

4. The method according to claim 1, wherein the determining one or more fuzzy words corresponding to the target word according to a phoneme sequence corresponding to the target and a preset phonetic dictionary, comprises:
   if a first phoneme and/or a last phoneme in the phoneme sequence corresponding to the target word is a phoneme of a second preset type, integrating other phonemes in the phoneme sequence than the phoneme of the second preset type into a new phoneme sequence, and selecting, from the plurality of words in the phonetic dictionary, one or more words corresponding to a phoneme sequence that is the same with the new phoneme sequence as the one or more fuzzy words corresponding to the target word.

5. A speech information processing device, comprising:
   a processor; and
   a memory for storing instructions executable by the processor;
   wherein the processor is configured to:
   determine text information corresponding to collected speech information according to a speech recognition technology, wherein the text information comprises a word;

with the word in the text information as a target word, determine one or more fuzzy words corresponding to the target word according to a phoneme sequence corresponding to the target and a preset phonetic dictionary, wherein the phonetic dictionary comprises a plurality of words and phoneme sequences corresponding to the plurality of words; and output the target word and the one or more fuzzy words corresponding to the target word;

wherein the processor is further configured to:

rank the one or more fuzzy words corresponding to the target word according to a preset priority;

in a case that the number of the one or more fuzzy words corresponding to the target word is greater than a preset number, select fuzzy words of the preset number from all the fuzzy words corresponding to the target word according to a ranking result, and outputting the target word and the selected fuzzy words; and in a case the number of the one or more fuzzy words corresponding to the target word is smaller than or equal to the preset number, output the target word and all the one or more fuzzy words corresponding to the target word according to the ranking result.

6. The device according to claim 5, wherein the processor is configured to:

from the plurality of words in the phonetic dictionary, select one or more words corresponding to a phoneme sequence that is the same as the phoneme sequence corresponding to the target word as the one or more fuzzy words corresponding to the target word.

7. The device according to claim 5, wherein the processor is further configured to:

in a case that the phoneme sequence corresponding to the target word comprises a phoneme of a first preset type, select from the plurality of words in the phonetic dictionary one or more words corresponding to a phoneme sequence that meets the following conditions as the one or more fuzzy words corresponding to the target word, with the phoneme sequence corresponding to the target word as a reference sequence:

the phoneme sequence corresponding to the one or more words in the phonetic dictionary comprises the phoneme of the first preset type, and a position of the phoneme of the first preset type in the phoneme sequence corresponding to the one or more words in the phonetic dictionary is the same with a position of the phoneme of the first preset type in the reference sequence; and a first phoneme sequence composed of other phonemes in the phoneme sequence corresponding to the one or more words in the phonetic dictionary than the phoneme of the first preset type, is the same as a second phoneme sequence composed of other phonemes in the reference sequence than the phoneme of the first preset type.

8. The device according to claim 5, wherein the processor is configured to:

in a case that a first phoneme and/or a last phoneme in the phoneme sequence corresponding to the target word is a phoneme of a second preset type, integrate other phonemes in the phoneme sequence than the phoneme of the second preset type into a new phoneme sequence, and select, from the plurality of words in the phonetic dictionary, one or more words corresponding to a phoneme sequence that is the same with the new phoneme sequence as the one or more fuzzy words corresponding to the target word.

9. A non-transitory computer-readable storage medium having computer program instructions stored thereon, wherein when the program instructions are executed, steps in a speech information method are performed;

wherein the method comprises:

determining text information corresponding to collected speech information according to a speech recognition technology, wherein the text information comprises a word;

with the word in the text information as a target word, determining one or more fuzzy words corresponding to the target word according to a phoneme sequence corresponding to the target and a preset phonetic dictionary, wherein the phonetic dictionary comprises a plurality of words and phoneme sequences corresponding to the plurality of words; and outputting the target word and the one or more fuzzy words corresponding to the target word;

wherein the outputting the target word and the one or more fuzzy words corresponding to the target word comprises:

ranking the one or more fuzzy words corresponding to the target word according to a preset priority;

if the number of the one or more fuzzy words corresponding to the target word is greater than a preset number, selecting fuzzy words of the preset number from all the fuzzy words corresponding to the target word according to a ranking result, and outputting the target word and the selected fuzzy words; and if the number of the one or more fuzzy words corresponding to the target word is smaller than or equal to the preset number, outputting the target word and all the one or more fuzzy words corresponding to the target word according to the ranking result.

10. A mobile terminal implementing the method according to claim 1, wherein the mobile terminal comprises a display screen configured to output the target word and the one or more fuzzy words corresponding to the target word for a user to select, thereby improving recognition accuracy for homonyms and words with confusing pronunciations.

11. The mobile terminal according to claim 10, further comprising a microphone to collect the speech information, and a speaker to output audio signals.

* * * * *